US005365649A

United States Patent [19]

Carl et al.

[11] Patent Number: 5,365,649

[45] Date of Patent: Nov. 22, 1994

[54] ASSIST TOOL FOR SEATING DOOR HINGE PIN

[75] Inventors: Richard M. Carl, Shelby Township, Macomb County; Joseph J. Lasota, Sterling Heights, both of Mich.

[73] Assignee: Chrysler Corporation, Highland Park, Mich.

[21] Appl. No.: 191,698

[22] Filed: Feb. 4, 1994

[51] Int. Cl.$^{5}$ .............................................. B23P 19/04

[52] U.S. Cl. ...................................................... 29/267

[58] Field of Search .................. 81/426, 418, 415–417; 29/267, 268

[56] References Cited

U.S. PATENT DOCUMENTS

| | | | |
|---|---|---|---|
| 828,625 | 8/1906 | Ogg . | |
| 1,141,916 | 6/1915 | Aderer . | |
| 1,299,103 | 4/1919 | Angle . | |
| 2,335,580 | 11/1943 | Chirelstein . | |
| 2,478,881 | 8/1949 | Wayrynen . | |
| 2,480,037 | 8/1949 | Luckins . | |
| 2,529,599 | 11/1950 | Dick . | |
| 2,716,365 | 8/1955 | Keeley, Jr. . | |
| 2,755,541 | 7/1956 | Kruger . | |
| 2,797,471 | 7/1957 | Hamburger . | |
| 2,818,758 | 1/1958 | Swanstrom et al. | 81/417 |
| 2,895,214 | 7/1959 | Erdmann . | |
| 3,143,790 | 8/1964 | Over et al. . | |
| 3,314,320 | 4/1967 | Early . | |
| 3,461,713 | 8/1969 | Donath . | |
| 3,681,839 | 8/1972 | Janecka . | |
| 4,075,749 | 2/1978 | Hubeny . | |
| 4,416,045 | 11/1983 | Staten . | |
| 4,627,141 | 12/1986 | Teske . | |
| 4,697,483 | 10/1987 | Rodgers . | |
| 4,720,911 | 1/1988 | Tubman . | |
| 4,787,139 | 11/1988 | Sweet . | |
| 4,881,434 | 11/1989 | Keller | 81/426 |
| 4,982,631 | 1/1991 | Lowther . | |
| 5,060,365 | 10/1991 | Lanzo . | |

*Primary Examiner*—Robert C. Watson
*Attorney, Agent, or Firm*—Edward P. Barthel

[57] ABSTRACT

An assist hand tool adapted for use in installing a vehicle door hinge pin comprising an L-shaped blockpiece having a forwardly extending bifurcated head portion terminating at its aft end in a downwardly extending bifurcated body portion. The bifurcated head portion has a pair of forwardly extending side walls defining a pin-receiving slot and the bifurcated base portion terminating at its lower end in a pair of downwardly extending body side walls defines a lever-receiving slot. An operating lever comprises an elongated handle section extending rearwardly through the body slot aft opening and a jaw section extending through the body slot forward opening. The handle section and the jaw section have their proximate ends interconnected by an inclined pivot section pivotally connected by a transverse pivot pin to the body walls. The head portion is cooperatively sized for snug fit between an upper and lower pair of door-half hinge flanges. The pin-receiving slot has upper and lower means wherein for self-aligned positioning relative to the hinge pin axis. Upon the operator exerting a force on the handle section the jaw section applies an axial end force against the pin headed-end driving it to a predetermined axial position.

7 Claims, 3 Drawing Sheets

ASSIST TOOL FOR SEATING DOOR HINGE PIN

BACKGROUND OF THE INVENTION

This invention relates to hinge pin assist tools and more particularly to a hand held tool for use in installing and/or removing a hinge pin on an automotive vehicle body door.

The prior art is replete with tools for installing and removing automobile door hinge pins. The ready installation and removal of door hinge pins with current automobile construction is becoming increasingly difficult. One reason for this is gaining access to the hinge pins with a hammer or with conventional pneumatic operated impact tools in order to drive the hinge pins in or out of the hinges. The U.S. Pat. No. 4,627,141 issued Dec. 9, 1986 to Teske discloses a rod or shaft type hinge pin tool for use with an air hammer for removing solid automobile hinge pins provided with a flat end or a pointed end and a head with an underside. The U.S. Pat. No. 4,432,125 issued Feb. 21, 1984 to Monteleone et al. discloses a rod type hinge pin tool for use with a fluid operated impact device to remove tubular hinge pins.

SUMMARY OF THE INVENTION

It is an object of the present invention to provide a hand tool operative for assisting in the ready installation of hinge pins on vehicle door hinge assemblies.

It is another feature of the present invention to provide a hand tool in which a pivoting handle jaw end is normally biased into a jaw-open mode for ready hinge location by a vehicle assembly line operator.

It is still another feature of the present invention to provide a hand tool adapted for predetermined positioning on a vehicle hinge assembly wherein, with the pin is in a first manually-installed initial position connecting body-half and door-half hinge plates, the hand tool is operative for driving the pin to a second predetermined position.

It is yet another object of the present invention to provide a hinge pin driving hand tool adapted for self-aligned positioning on a vehicle hinge assembly whereby, with the hinge pin set in its installed position, the tool is operative for axially dislodging the pin enabling an operator to manually remove the pin from the hinge assembly.

DESCRIPTION OF THE DRAWINGS

These and other features, objects and advantages of the invention will become apparent upon consideration of the specification and appended claims in which:

DETAILED DESCRIPTION OF THE INVENTION

Figure 1:
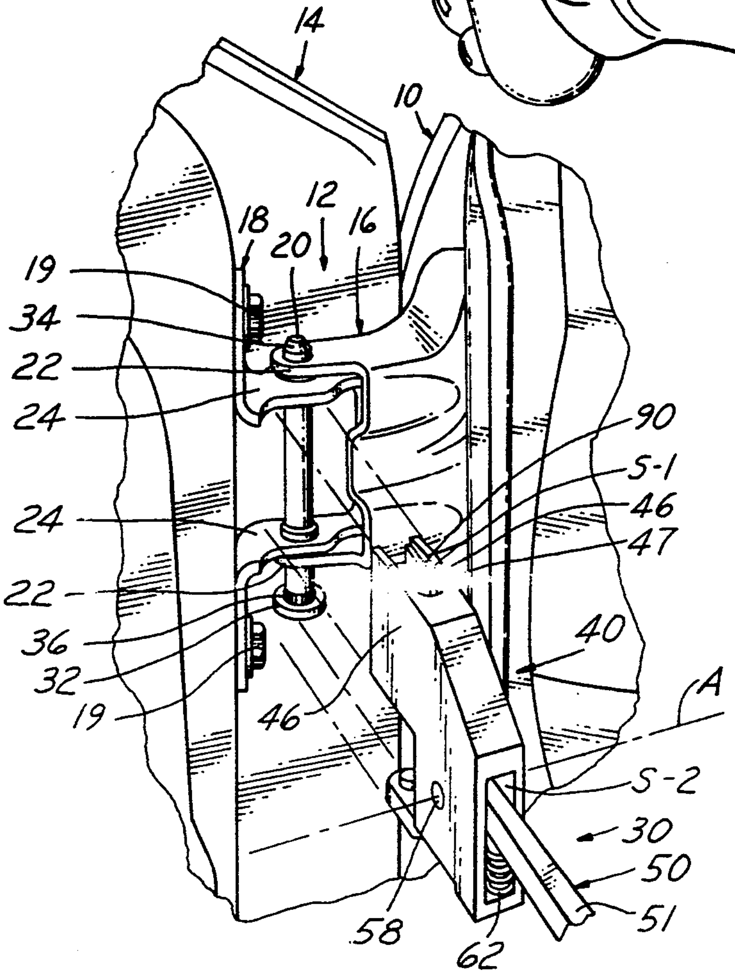
FIG. 1 is a fragmentary perspective view from the exterior of the vehicle illustrating a vehicle body door in its open position with the pin seating hand tool of the invention shown prior to being laterally moved into engagement with the hinge pin.

Turning now to the drawings, FIG. 1 shows a portion of a vehicle body door frame "A" pillar 10 showing an upper hinge assembly 12 supporting a vehicle door 14 in its full open position. The hinge assembly 12 comprises an body-half hinge plate 16 secured as by bolts (not shown) to the "A" pillar 10 and a door-half hinge plate 18 secured by bolts 19 to the door 14 with the hinge plates pivotally connected by a hinge pin 20. It will be noted that the hinge assembly 12 is a conventional vehicle door hinge wherein the hinge pin is inserted in aligned holes in upper and lower flanges 22 of the body-half hinge plate 16 and upper and lower flanges 24 of the door-half hinge plate 18.

A hinge pin hand tool, generally indicated at 30, in accordance with one form of the invention is provided to assist the operator in the final setting of initial or partially installed hinge pin 20 when remounting the vehicle door 14. In a vehicle assembly plant using a "door-off process" the vehicle doors are temporarily installed on the body to allow for the painting of the doors and body. The doors are then removed and built-up off-line with various components, such as window regulators, handle hardware etc., and thereafter re-installed on the final assembly line.

Figure 5:
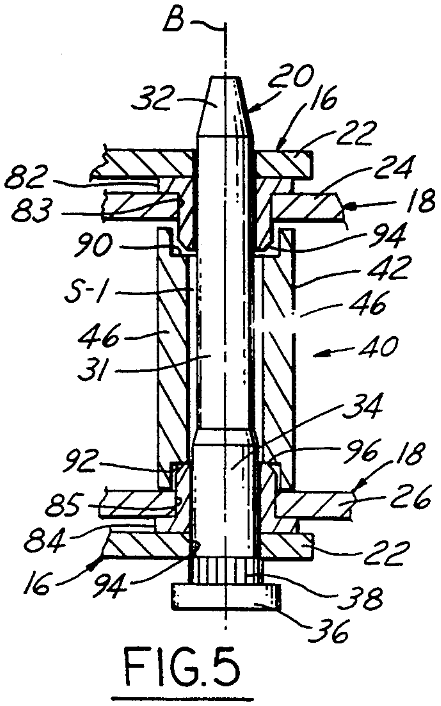
FIG. 5 is a fragmentary vertical sectional view taken on the line 5—5 of FIG. 4.

Because of several factors such as build tolerances, paint on the hinge and pin, body-half and door-half hinge plate hole alignment etc., the operator is unable to fully install the pin 20 in the hinge holes without the assistance of a tool of some type. With reference to FIG. 5 it will be seen that the hinge pin 20 has its stem 31 formed with a tapered lead-in point 32 at one end and an enlarged diameter shank portion 34 at its other end terminating in a head 36. An alternating number of axially extending grooves and ridges or serrations 38 are formed on a portion of the hinge pin shank 34 adjacent the head 36.

Figure 3:
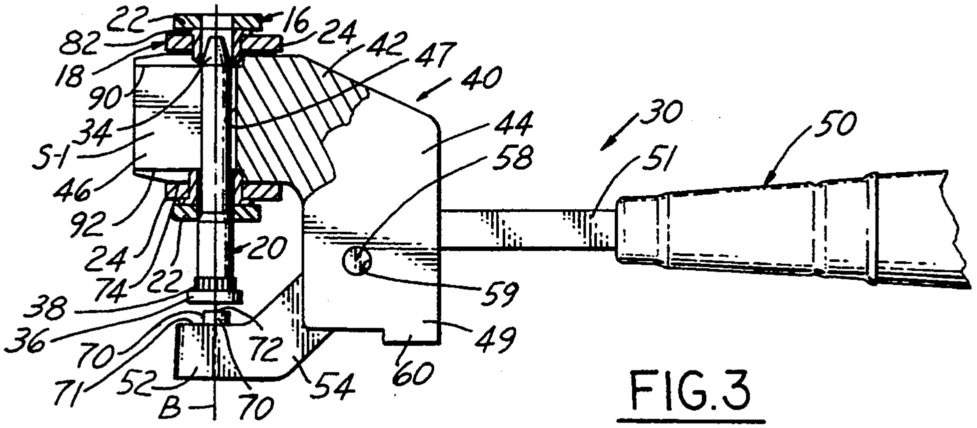
FIG. 3 is a fragmentary side view of the tool with a broken-away portion shown in vertical cross-section taken on the line 3—3 of FIG. 1.
Figure 8:
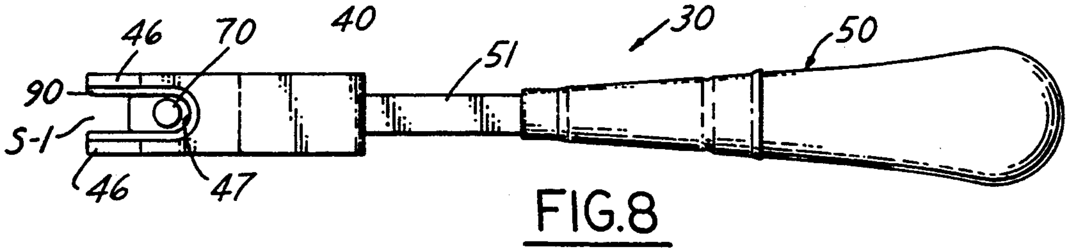
FIG. 8 is a top view of the hand tool.

Turning now to FIG. 3 the hand tool 30 comprises a right angle-shaped blockpiece 40 comprising a forwardly extending bifurcated upper head portion 42 and a downwardly extending bifurcated body portion 44. The bifurcated jaw portion 42 has a pin-receiving slot S-1 formed by a pair of forwardly extending vertically disposed head side walls 46—46 joined at a upright closedend 47. As seen in FIG. 8 the head slot closed end 47 has a half-round shape when viewed in vertical section. The vertically disposed head side walls 46—46 are cooperatively spaced apart a predetermined dimension to receive the hinge pin 20 through a forward open end of the pin-receiving slot S-1.

The blockpiece bifurcated body portion 44 has a lever-receiving body slot S-2 formed by a pair of downwardly extending body side walls 48—48 joined by an upwardly and rearwardly sloped slot closed end 49. Thus, the lever-receiving slot is defined by forward, aft, and bottom openings. The body slot side walls 48—48 are cooperatively spaced apart to receive an operating lever 50 in the body slot S-2.

Figure 9:
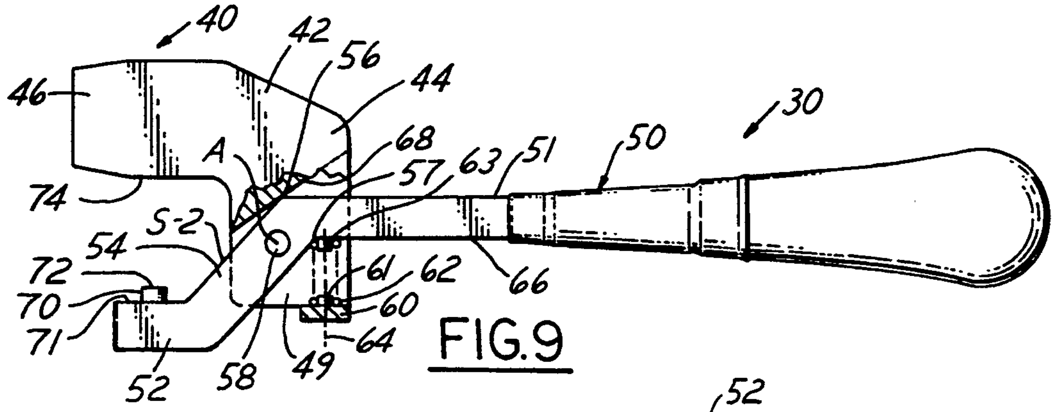
FIG. 9 is a side view of the hand tool including broken-away portions for purposes of illustration.
Figure 10:
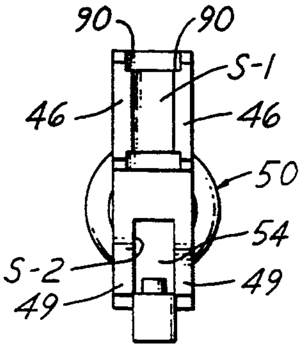
FIG. 10 is a front view of the FIG. 9 tool.

With reference to FIG. 9 the operating lever 50 comprises an elongated rearwardly extending handle section 51 and a forwardly extending offset jaw section 52 interconnected by an upwardly and rearwardly inclined intermediate pivot section 54. It will be seen that the lever handle section 51 projects rearwardly through the body slot aft opening while the jaw section 52 projects forwardly through the base slot forward opening. The handle section 51 and the offset jaw section 52 each have a proximate end integrally joined by the intermediate inclined pivot section 54. It will be noted in FIG. 9 that the handle section proximate end connection with the pivot section 54 is defined by an upper transversely extending external corner juncture 56 and a lower internal corner juncture 57.

FIG. 9 shows the lever member 50 connected for pivotal movement in the body slot S-2 by means of a transversely extending pivot pin 58 received in aligned through bores 59 in each of the body side walls 49—49. It will be noted in FIGS. 1 and 9 that the pivot pin 58 defines a pivot axis "A" located a predetermined dimension forward of the lever upper corner juncture 56.

With reference to FIG. 9 the body slot S-2 has its bottom opening bridged by a transversely extending plate portion 60 with its longitudinally extending ends connected to its associated base side walls 49. The plate 60 has an upright stub pin 61 encircled by a lower end of a vertically disposed coil compression spring 62 while the spring upper end encircles a vertically aligned stub pin 63 fixed to an opposed undersurface 66 of the handle portion 51. The compression spring 62 exerts an upward counter-clockwise spring load on the lever aft of its pivot axis "A" biasing its upper corner juncture 56 into arresting contact with the body slot closed end wall 49 establishing a predetermined jaw open limit stop for the tool.

It will be noted that the body slot closed upper end 49 is shown in FIG. 9 inclined upwardly and rearwardly from the body slot S-2 forward opening a predetermined obtuse angle of about 130 degrees from the vertical.

FIG. 3 shows the tool in a handle jaw-end open mode with its head portion 42 sized for selective seated reception between the door-half hinge upper and lower flanges 24. It will be noted that the half-round closed end 47 of the pin-receiving slot S-1 is concentrically positioned about a partially inserted hinge pin 20. Said differently the hinge pin principal axis "A" is aligned on the center of curvature of the half-round closed end 47. The operating lever offset jaw section 52 is seen provided with an upstanding cylindrical drive lug 70 fixed on a substantially horizontal upper surface 71 thereof. It will be seen in FIG. 8 that the drive lug 70 is disposed with its principal axis in vertical alignment with the axis of curvature of the half-round end wall 47.

With reference to FIG. 9 it will be seen that the drive lug 70 has its free end 72 positioned a predetermined dimension from the opposed undersurface 74 of the pin-receiving slot wall portions 46 so as to position the drive lug free end 72 closely adjacent the hinge pin head 36. It will be understood that in a vehicle assembly line application the tool 30 is specifically designed for one type of vehicle body door hinge assembly wherein the fitted vehicle doors are removed after painting and then remounted. Thus, the hinge pin 20 is shown in FIG. 3 in a manually installed position wherein the excess paint on the hinges prevents the pin from being fully inserted through its associated flange holes.

Figure 2:
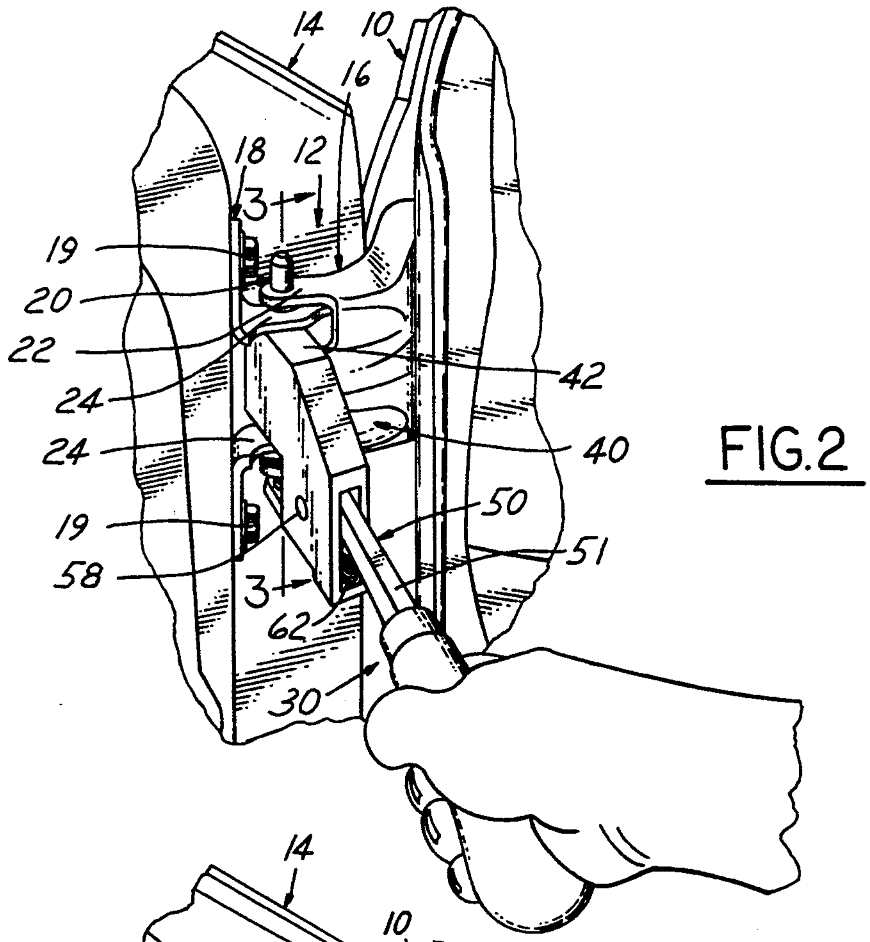
FIG. 2 is a fragmentary perspective view similar to FIG. 1 showing the tool moved into its pin engaged position.

FIG. 1 shows the tool 30 in a first pre-position aligned with the upper hinge assembly 12 whereby the operator initially moves the tool horizontally, in its jaw end-open mode, whereby the blockpiece head portion 42 is located between the door-half hinge flanges 24 until the hinge pin 20 is located in the pin-receiving slot S-1 (FIG. 2).

It will be noted in FIG. 5 that the hinge pin 20 is supported on the hinge axis "B" by an upper bushing 82 received in door-half hinge plate upper flange hole 83 and a lower bushings 84 received in door-half hinge plate lower flange hole 85. The tool head portion 42 is adapted for self-positioning on the hinge pin axis "B" by cooperative self-aligned engagement with the upper and lower bushings. It will be seen in FIGS. 1, 5 and 8 that the upper and lower edges of the pin-receiving slot wall portions 46 are formed with opposite countersunk guide shoulders 90 and 92, each having a U-shape when view in plan (FIG. 8 ). The upper bushing 82 has a predetermined first diameter such that its underside 94 is adapted to be guided on the upper shoulder 90 while the lower bushing 84 has a predetermined second diameter such that its underside 96 is adapted to be guided on the lower shoulder 92. Thus, the tool head portion is guided inwardly and seated by its upper and lower closed end half-round shoulder portions the drive lug 70 is aligned on the hinge pin axis "B".

Figure 4:
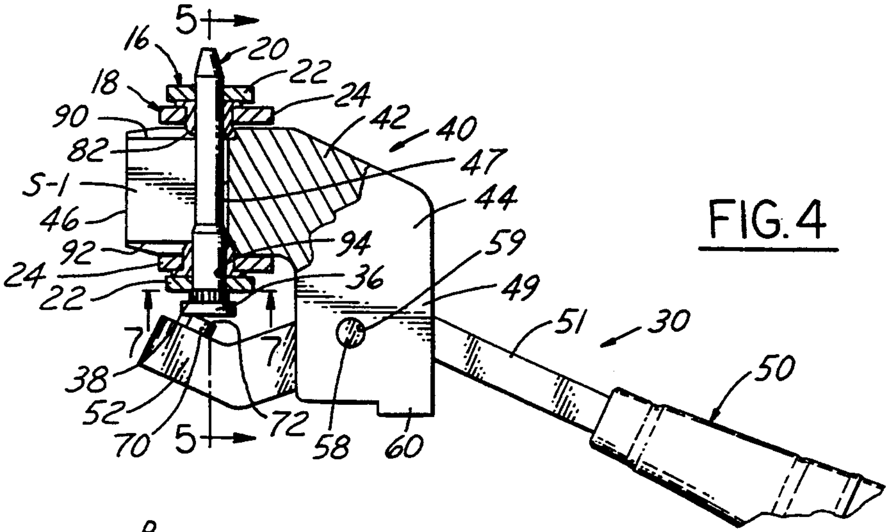
FIG. 4 is a fragmentary view similar to FIG. 3 showing the installing tool with its tool handle rotated downwardly to a hinge pin partially installed position.
Figure 6:
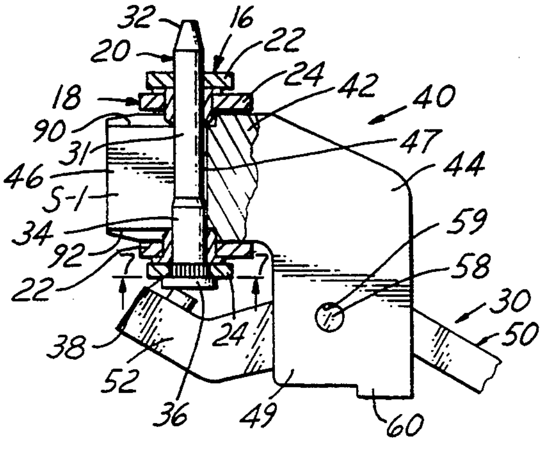
FIG. 6 is a fragmentary view similar to FIG. 4 showing a hinge pin having been fully installed by the hand tool.
Figure 7:
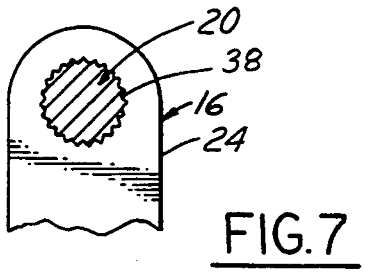
FIG. 7 is a fragmentary horizontal sectional view taken on the line 7—7 of FIG. 6.

The operator next pivots the handle section 51 downwardly in a clockwise manner causing the jaw section to pivot upwardly wherein the drive lug 70 engages the hinge pin head 36 applying an upward force driving the pin upwardly into the hinge flange holes to the position shown in FIG. 4. It will be noted that in the FIG. 4 position the pin is driven upwards until its serrations 38 reach hole 94 of the lower flange 22. At this point an air or hydraulic tool or the like may be used to move the pin 20 upward to a press-fit set position wherein the serrations 38 are driven into locked engagement with the hole 94 as shown in FIG. 6, for example.

Figure 11:
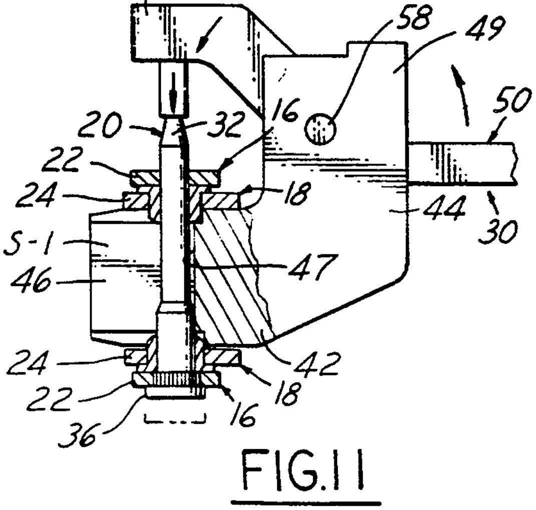
FIG. 11 is a fragmentary side view of a modified hand tool of the present invention illustrating how the tool may be used for dislodging a hinge pin of a vehicle door hinge assembly which has been installed in a pressfit manner.

It will be understood, however, that the invention contemplates a modified second embodiment wherein a tool 30', shown in FIG. 11, is employed for dislodging a vehicle door hinge pin. The tool 30' is shown modified by extending the length of the handle section 51 to achieve an increased mechanical advantage, if needed, to unseat the pin locking serrations 38 from an associated hinge plate flange hole. Further, FIG. 11 shows the tool 30' provided with a modified drive lug 70', having a length a predetermined dimension greater than the drive lug 70. The added length of the drive lug 70' enables the operator to axially dislodge the hinge pin axially a determined dimension so as to release the interlocked serrations 38 from the hinge flange hole 94 whereby the pin may be manually removed from the hinge assembly.

The hinge assembly 12 of the present disclosure concerns an upper door hinge wherein the pin is installed upon being driven upwardly by the hand tool 30. It will be appreciated, however, that the hand tool 30 may be inverted for driving a partially inserted hinge pin downwardly for press-fit locking of the pin serrations 38.

Although only one embodiment of the invention have been illustrated and described, it is apparent that modifications and variations will readily come to mind of a person skilled in the art which modifications and variations do not fall outside the scope of the invention as defined by the following appended claims.

What is claimed is:

1. In a hand tool for installing a hinge pin pivotally interconnecting first and second hinge plates hanging a door on a vehicle body, said hinge plates each having upper flange means and lower flange means with aligned apertures adapted to receive the hinge pin into a position establishing a door hinge pivot axis, said tool comprising:

an angle-shaped blockpiece defined by a forwardly extending bifurcated upper head portion terminating at an aft closed end in a downwardly extending bifurcated body portion, said bifurcated head portion defining a pin-receiving slot between a pair of forwardly extending head portion side walls cooperatively spaced apart to receive through a forward open end of said pin-receiving slot a vertically disposed hinge pin therebetween, said bifurcated body portion defining a lever-receiving slot with forward, aft, and bottom openings between a pair of downwardly extending body side walls cooperatively spaced apart to receive a lever therebetween;

said lever comprising an elongated handle section extending rearwardly through said body slot aft opening and a jaw section extending through said body slot forward opening, said lever handle section and said jaw section each having a proximate end thereof interconnected by an intermediate pivot section, wherein said pivot section inclined forwardly and downwardly from said handle section proximate end to said jaw section proximate end, means mounting said pivot section in said lever-receiving slot for pivotal movement about a horizontal pivot axis;

said head section cooperatively sized for a snug fit between upper and lower apertured flanges of the first hinge plate retaining said hinge pin on said hinge pin axis, said pin-receiving slot having seating means adapted to seat the hinge pin in a self-aligned manner on the hinge pin axis;

said lever handle section proximate end connection with said inclined pivot section defining an upper transverse extending edge juncture positioned a predetermined dimension aft of said pivot axis, said edge juncture adapted to engage an opposed rearwardly and upwardly extending beveled bight wall internal surface of said body portion lever-receiving slot with said lever biased in said open position; and said lever movable against spring biasing means to a jaw section open position wherein said head portion being guided inwardly and seated in said pin-receiving seating slot means with said jaw section having driving means juxtaposed one end of the hinge pin, whereby in response to the operator exerting a closing force on the lever handle section said jaw section driving means applies an axial thrust against the hinge pin one end thereby moving the pin on the hinge axis to a predetermined position.

2. The hand tool as set forth in claim 1 wherein said spring means comprising a coil compression spring positioned intermediate said lever handle portion and said head member base portion.

3. The hand tool as set forth in claim 1 wherein said lever pivot means comprising a cross-pin extending transversely between said pair of body portion side walls.

4. The hand tool as set forth in claim 1 wherein said pin-receiving slot seating means comprising upper and lower half-round seats formed on said pin-receiving slot aft closed end.

5. The hand tool as set forth in claim 4 wherein said upper and lower half-round seats each in the form of a countersunk shoulder formed around the upper and lower peripheries of said pin-receiving slot, each said countersunk shoulder having a U-shape when viewed in horizontal section contoured to slidably seat an associated upper and lower cylindrical bushing journally supporting the hinge pin.

6. The hand tool as set forth in claim 1 wherein said jaw section driving means comprising an upstanding lug adapted to engage said hinge pin one end.

7. The hand tool as set forth in claim 2 wherein said coil compression spring positioned adjacent said lever-receiving slot aft opening, said coil spring positioned with its principal axis disposed vertically and having one upper end connected to an opposed undersurface of said lever handle section and its opposite lower end connected to a plate portion, said plate portion having its longitudinal edges connected to associated body slot side walls.

* * * * *